United States Patent
Hayashi et al.

(10) Patent No.: US 6,851,720 B2
(45) Date of Patent: Feb. 8, 2005

(54) HYDRAULIC JOINT STRUCTURE

(75) Inventors: Mitsuharu Hayashi, Nishio (JP); Kenichi Suzuki, Aichi-ken (JP); Yuichiro Sakakibara, Hekinan (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/395,273

(22) Filed: Mar. 25, 2003

(65) Prior Publication Data

US 2003/0178849 A1 Sep. 25, 2003

(30) Foreign Application Priority Data

Mar. 25, 2002 (JP) ........................................ 2002-084298

(51) Int. Cl.[7] ............................................... F16L 55/00
(52) U.S. Cl. ........................................ 285/13; 285/355
(58) Field of Search ........................ 285/13, 14, 332.2, 285/332.3, 355

(56) References Cited

U.S. PATENT DOCUMENTS

| | | | | |
|---|---|---|---|---|
| 1,756,045 A | * | 4/1930 | Wilhelmi ................. | 285/332.3 |
| 2,104,799 A | * | 1/1938 | Evans ...................... | 285/332.2 |
| 2,823,699 A | * | 2/1958 | Willis .......................... | 285/14 |
| 3,288,494 A | * | 11/1966 | Callahan, Jr. et al. ........ | 285/14 |
| 3,822,902 A | * | 7/1974 | Maurer et al. ........... | 285/332.2 |
| 4,489,963 A | * | 12/1984 | Raulins et al. ........... | 285/332.3 |
| 4,807,945 A | * | 2/1989 | Budecker et al. ........ | 303/114.1 |

* cited by examiner

*Primary Examiner*—David Bochna
(74) *Attorney, Agent, or Firm*—Burns, Doane, Swecker & Mathis, L.L.P.

(57) ABSTRACT

In a hydraulic joint structure for joining respective tubular joint portions of two members, opposed pressure-contact surfaces of the two members for preventing loosening form a downstream space on the downstream side of a seal member. A passage is formed on the pressure-contact surfaces in such a manner that when working fluid leaks from the upstream side of the seal member to the downstream space via a clearance between the seal member and the tubular joint portions, the passage permits the working fluid to flow from the downstream space to an external space in the state in which the pressure-contact surfaces are in pressure contact. The passage is formed in such a manner that the passage extends in a circumferential direction of the thread portions, and communicates at one end with the downstream space and at the other end with the external space.

2 Claims, 5 Drawing Sheets

HYDRAULIC JOINT STRUCTURE

BACKGROUND OF THE INVENTION

1. Field of the Invention

The present invention relates to a hydraulic joint structure including two members which are screw-engaged with each other, with an annular seal member interposed therebetween, in order to mutually connect hydraulic passages formed in the members.

2. Description of the Related Art

Japanese Patent No. 2576998 discloses a hydraulic joint structure of the above-described type. In the disclosed hydraulic joint structure, two members to be screw-engaged together have respective pressure-contact surfaces which oppose each other and prevent loosening between thread portions of the two members. When the two members are screw-engaged together, the pressure-contact surfaces of the members come into pressure contact with each other to thereby form a space on the downstream side (external space side) of a seal member. In the case of a hydraulic joint structure having the above-described configuration, seal inspection is performed in order to guarantee seal performance. Specifically, in a state in which a gap of about 0.5 mm is formed between the pressure-contact surfaces of the two members, pressurized working fluid is applied to the upstream side of the seal member, and the external space is visually inspected so as to determine whether the working fluid leaks to the external space via the gap. In the case where the seal inspection is performed in a state in which the two members have been tightly screw-engaged together in order to eliminate the gap between the pressure-contact surfaces, even when the seal member is defective, the working fluid does not leak to the external space, by virtue of the seal action of the pressure-contact surfaces, thereby rendering the visual inspection unreliable. Notably, the seal performance of the pressure-contact surfaces is influenced by variations in the environment, such as temperature variation and permanent set of the materials of the members (i.e., the seal action is unstable), and therefore is not expected to continue for a long term.

After completion of the above-described seal inspection, in order to eliminate the gap between the pressure-contact surfaces, a process for tightly screw-engaging the two member each other must be performed, thereby deteriorating work efficiency. Further, in order to enable seal inspection to be performed in a state in which the two members have been tightly screw-engaged together to thereby eliminate the gap between the pressure-contact surfaces, a communication groove may be formed on one of the pressure-contact surfaces in order to enable working fluid that has leaked because of a seal defect to flow to the external space via the communication groove. However, when the communication groove extends in a radial direction of the members, the distance between the external space and the seal member is short, and foreign matter or water is likely to enter and reach the seal member via the communication groove, possibly damaging the seal member.

SUMMARY OF THE INVENTION

In view of the foregoing problems with the conventional joint structures, an object of the present invention is to provide a hydraulic joint structure including two members to be screw-engaged with each other with an annular seal member interposed therebetween, which structure enables seal inspection to be effected through visual checking which is performed, in a state in which the two members have been assembled, for checking presence or absence of working fluid leaking to the external space via a passage formed on opposed pressure-contact surfaces of the members, and which structure prevents foreign matter or water from reaching the seal member via the passage and damaging the seal member.

In order to achieve the above object, the present invention provides a hydraulic joint structure, comprising: a first member having a first tubular joint portion and a hydraulic passage extending to the first tubular joint portion, the first tubular joint portion having a female thread portion at an end thereof; a second member having a second tubular joint portion and a hydraulic passage extending to the second tubular joint portion, the second tubular joint portion having a male thread portion at an end thereof for screw-engagement with the female thread portion; and an annular seal member disposed between the female thread portion and an end surface of the first tubular joint portion, the seal member abutting, in a liquid-tight manner, the first tubular joint portion at its outer circumference and the second tubular joint portion at its inner circumference. The first member has a first pressure-contact surface constituted by the end surface of the first tubular joint portion, whereas the second member has a second pressure-contact surface, the second pressure-contact surface surrounding the second tubular joint portion and being brought into contact with the first pressure-contact surface in order to prevent loosening of the thread portions and to form a downstream space on the downstream side of the seal member, with respect to a direction of flow of any leaking working fluid. A passage is formed on at least one of the first and second pressure-contact surfaces in such a manner that when working fluid leaks from the upstream side of the seal member to the downstream space via a clearance between the seal member and the first and second tubular joint portions, the passage permits the working fluid to flow from the downstream space to an external space in the state in which the first and second pressure-contact surfaces are in pressure contact. The passage is formed in such a manner that the passage extends in a circumferential direction of the thread portions, and communicates at one end with the downstream space and at the other end with the external space.

The present invention further provides a hydraulic joint structure used for joining a housing of a hydraulic accumulator to a housing of a hydraulic device, comprising: a first tubular joint portion being integral with the housing of the hydraulic device and having a female thread portion at an end thereof, a hydraulic passage formed in the housing of the hydraulic device extending to the first tubular joint portion; a second tubular joint portion being integral with the housing of the hydraulic accumulator and having a male thread portion at an end thereof for screw-engagement with the female thread portion, a hydraulic passage formed in the housing of the hydraulic accumulator extending to the second tubular joint portion; and an annular seal member disposed between the female thread portion and an end surface of the first tubular joint portion, the seal member abutting, in a liquid-tight manner, the first tubular joint portion at its outer circumference and the second tubular joint portion at its inner circumference. The housing of the hydraulic device has a first pressure-contact surface constituted by the end surface of the first tubular joint portion, whereas the housing of the hydraulic accumulator has a second pressure-contact surface, the second pressure-contact surface surrounding the second tubular joint portion and being brought into contact with the first pressure-contact surface in order to prevent loosening of the thread portions and to form a downstream space on the downstream side of the seal member, with respect to a direction of flow of any leaking working fluid. A passage is formed on at least one of the first and second pressure-contact surfaces in such a manner that when working fluid leaks from the upstream side of the seal member to the downstream space via a clearance between the seal member and the first and second tubular joint portions, the passage permits the working fluid to flow from the downstream space to an external space in the state in which the first and second pressure-contact surfaces are in pressure contact. The passage is formed in such a manner that the passage extends in a circumferential direction of the thread portions, and communicates at one end with the downstream space and at the other end with the external space.

By virtue of the above-described configuration, seal inspection for guaranteeing seal performance can be performed in a state in which the two members have been tightly screw-engaged together in order to eliminate the gap between the pressure-contact surfaces. Specifically, after completion of assembly of the two members, pressurized working fluid is applied to the upstream side of the seal member and visual inspection is performed in order to determine whether the working fluid leaks to the external space via the passage. Therefore, efficiency of work, including the seal inspection for guaranteeing seal performance, can be improved.

Further, since the passage is formed to extend circumferentially along the thread portions of the two members, the length of the passage as measured from one end to the other end thereof can be increased to a sufficient degree, to thereby increase the distance from the external space to the seal member to a sufficient degree. Therefore, this configuration prevents foreign matter and water from reaching the seal member via the passage, to thereby reliably mitigate damage to the seal member which would otherwise be caused by the foreign matter or water.

In the above-described hydraulic joint structures, the passage is preferably constituted by a spiral groove formed on at least one of the pressure-contact surfaces.

The spiral groove can be easily formed through cutting by use of a lathe or die-pressing. The spiral groove is not required to be formed directly on either one of the pressure-contact surfaces, and may be formed on a washer which is disposed between the pressure-contact surfaces. Alternatively, the spiral groove may be formed by a spiral washer formed from a wire or plate material. Preferably, the washer is formed from gasket material or metal which hardly deforms upon reception of large compressive load over a long period of time. Further, when the spiral groove is formed by means of die-pressing, the spiral groove can be formed to extend circumferentially while meandering radially in order to increase the overall length of the spiral groove.

BRIEF DESCRIPTION OF THE DRAWINGS

Various other objects, features, and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENT

Figure 1:
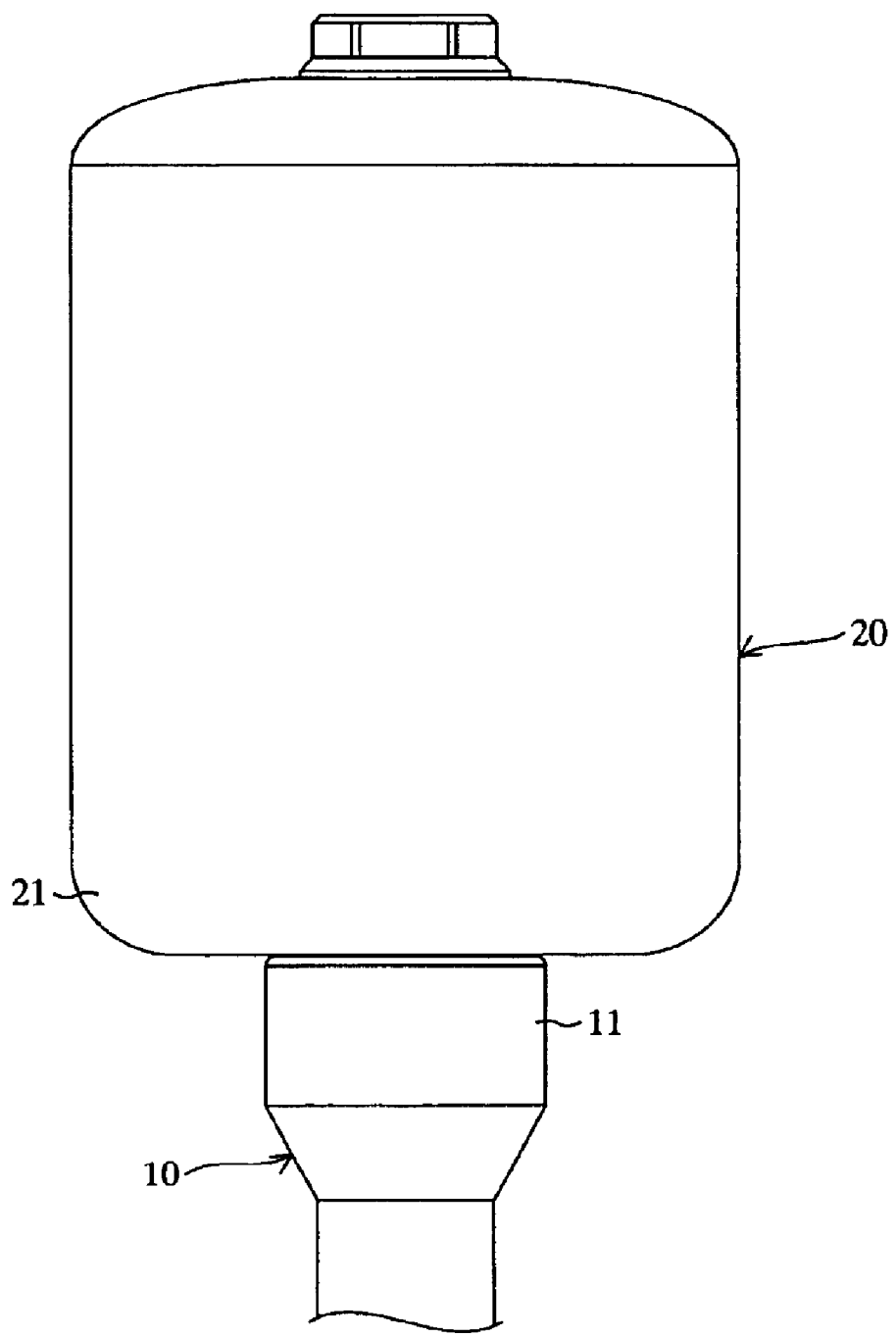
FIG. 1 is a front view of a hydraulic joint structure according to an embodiment of the present invention.
Figure 2:
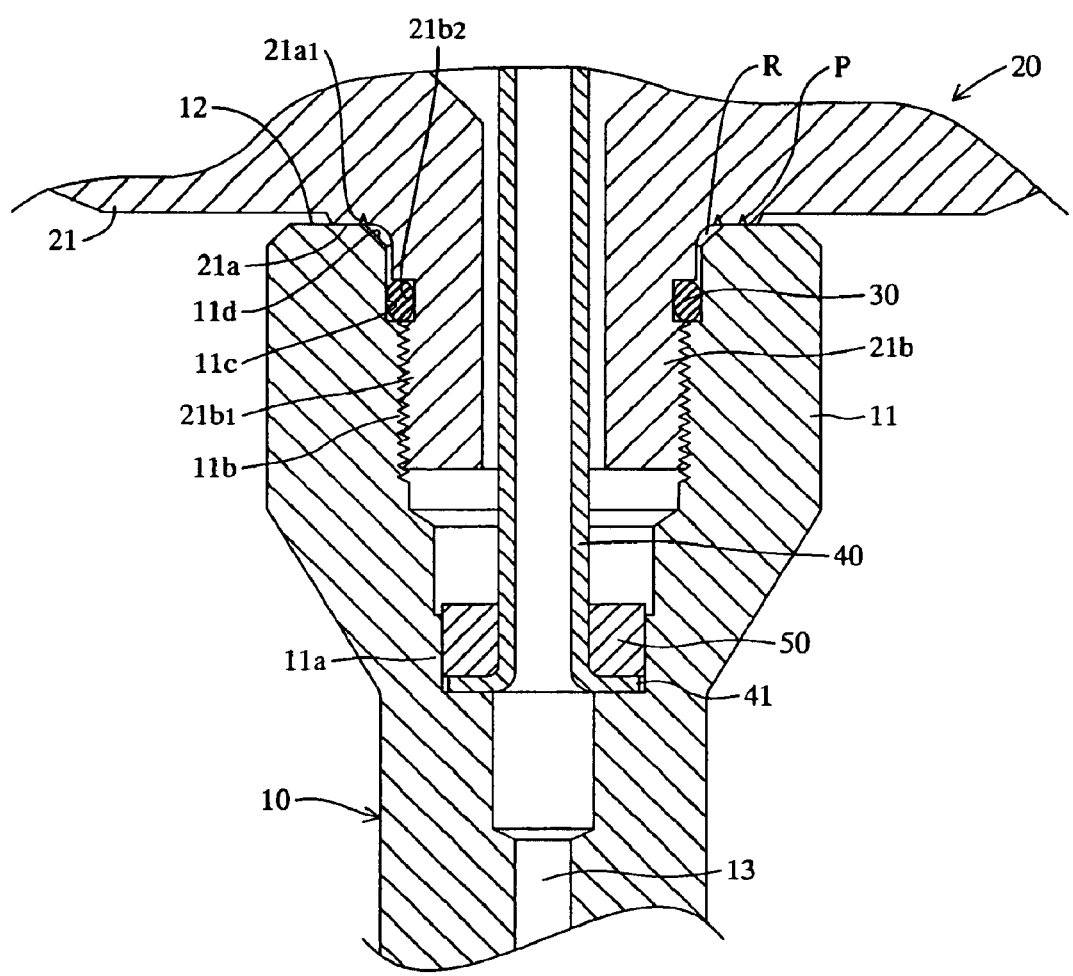
FIG. 2 is an enlarged cross-sectional view of a main portion of the hydraulic joint structure of FIG. 1.

An embodiment of the present invention will now be described with reference to the drawings. FIGS. 1 to 4 show an embodiment in which the hydraulic joint structure of the present invention is applied to attachment of a hydraulic accumulator 20 to a pump housing 10. In the hydraulic joint structure, the hydraulic accumulator 20 is attached to the pump housing 10 via an annular seal member 30.

The pump housing 10 has a hydraulic passage opening portion (tubular joint portion) 11, which has a pipe-retainer attachment portion 11a, a female thread portion 11b, a cylindrical seal portion 11c, and a chamfered portion 11d. Further, the pump housing 10 has an annular pressure-contact surface 12, which is constituted by an opening-side end surface of the hydraulic passage opening portion 11. An annular pressure-contact surface 21a, which is formed on a housing 21 of the hydraulic accumulator 20, is in direct contact with the pressure-contact surface 12.

The pipe-retainer attachment portion 11a is formed at the deepest portion of the hydraulic passage opening portion 11. A flange portion 41 of a pipe 40, which extends from the interior of the housing 21 of the hydraulic accumulator 20, is fixed to the pipe-retainer attachment portion 11a by means of an annular retainer 50. The female thread portion 11b is formed on the opening side relative to the pipe-retainer attachment portion 11a; and a male thread portion 21b1 of a cylindrical joint portion (tubular joint portion) 21b formed on the housing 21 of the hydraulic accumulator 20 is in screw-engagement with the female thread portion 11b.

The cylindrical seal portion 11c is formed on the opening side relative to the female thread portion 11b; and an outer circumferential surface of the seal member 30 is in close contact with the cylindrical seal portion 11c. The chamfered portion 11d is formed on the opening side relative to the cylindrical seal portion 11c, and forms, in cooperation with the housing 21 of the hydraulic accumulator 20, an annular downstream space R on the downstream side (upper side in FIG. 2) of the seal member 30.

Figure 3:
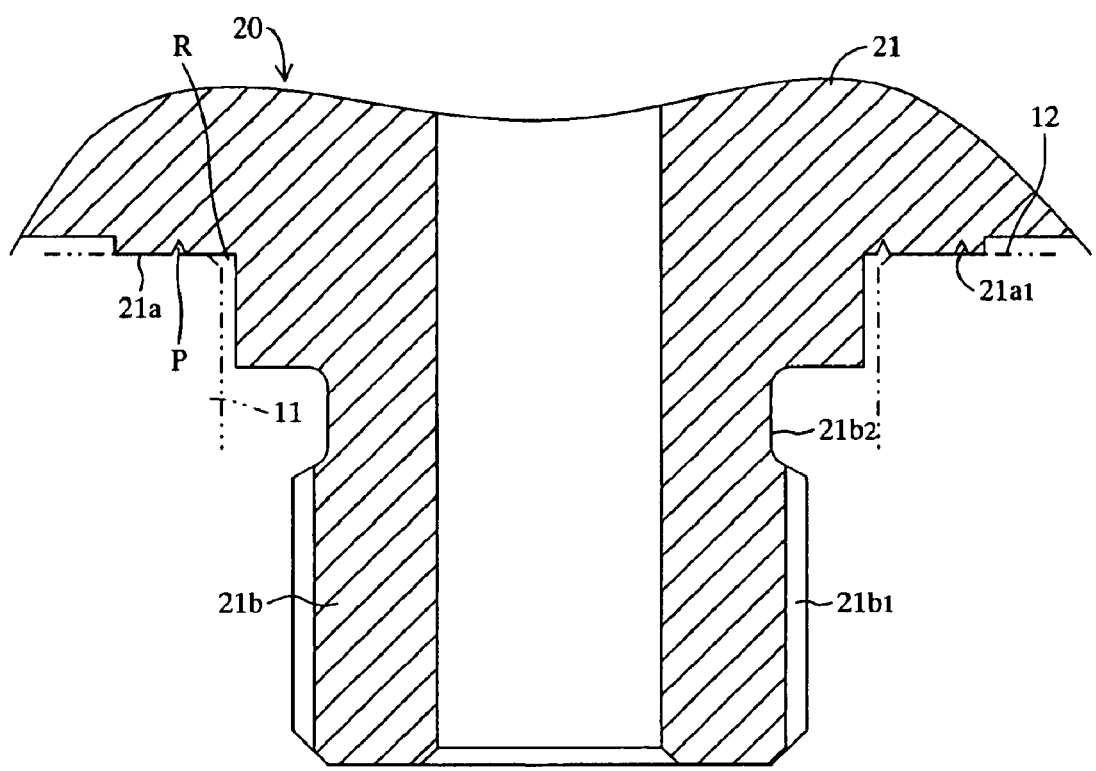
FIG. 3 is a partial enlarged cross-sectional view of a housing of the hydraulic accumulator shown in FIG. 2.
Figure 4:
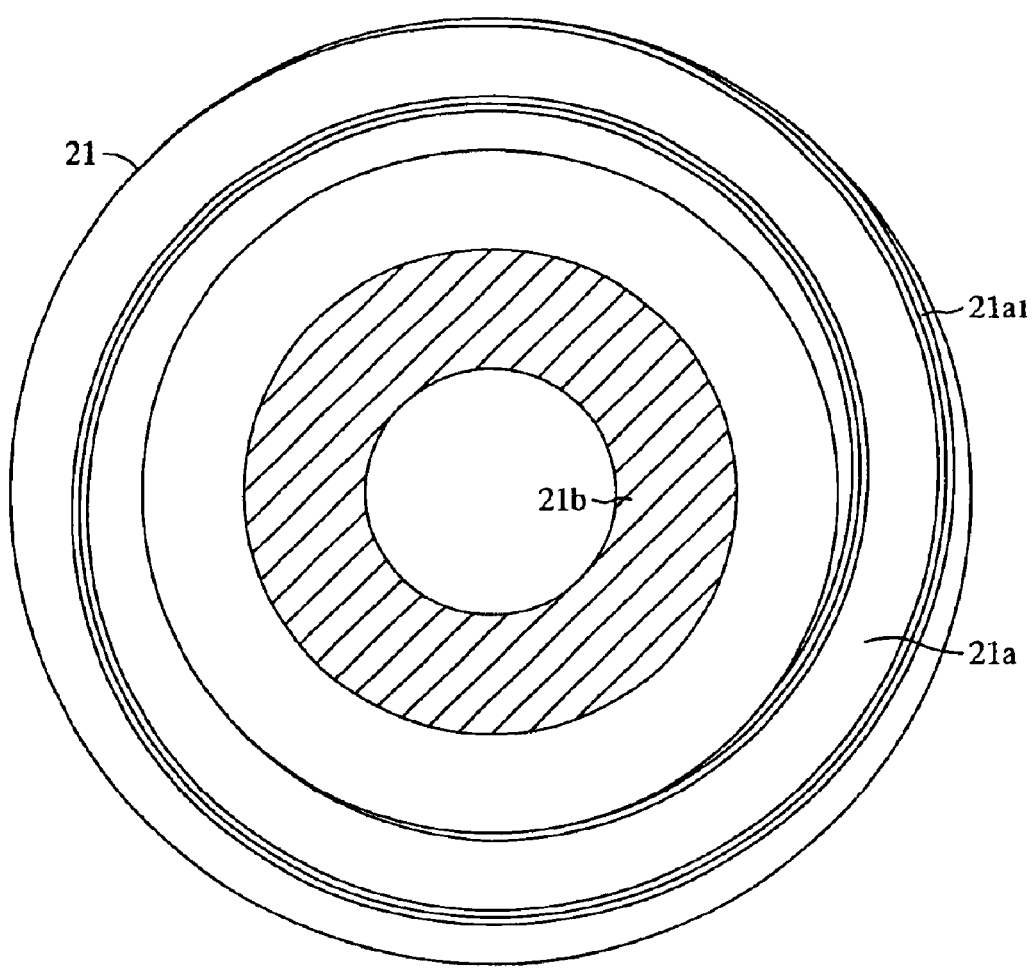
FIG. 4 is a bottom view showing the entirety of a spiral grove shown in FIG. 3.

The hydraulic accumulator 20 is hydraulically connected to a hydraulic circuit 13 formed in the pump housing 10. The housing 21 of the hydraulic accumulator 20 has the above-described annular pressure-contact surface 21a and the above-described cylindrical joint portion 21b. The male thread portion 21b1 and an annular attachment groove 21b2 for receiving the seal member 30 are formed on the cylindrical joint portion 21b. The pressure-contact surface 21a of the housing 21, which surrounds the cylindrical joint portion 21b, comes into pressure-contact with the pressure-contact surface 12 of the pump housing 10 to thereby prevent loosening of the thread portions 11b and 21b1. As shown in FIGS. 3 and 4, a spiral groove 21a1 is formed on the pressure-contact surface 21a.

The spiral groove 21a1 is formed through cutting by use of a lathe such that the spiral groove 21a1 has a V-shaped cross section. When the pressure-contact surface 21a of the housing 21 comes into pressure-contact with the pressure-contact surface 12 of the pump housing 10, a passage P is formed between the pressure-contact surfaces 12 and 21a.

The passage P communicates at one end with the downstream space R and at the other end with an external space (atmosphere), and extends in the circumferential direction of the thread portions. When working fluid leaks from the upstream side of the seal member 30 (i.e., from the thread portions) to the downstream space R via a clearance between the outer circumferential surface of the seal member 30 and the hydraulic passage opening portion 11 and/or a clearance between the inner circumferential surface of the seal member 30 and the cylindrical joint portion 21b of the housing 21 of the hydraulic accumulator 20, the passage P permits the working fluid to flow from the downstream space R to the external space in the state in which the pressure-contact surfaces 12 and 21a are in pressure contact.

The seal member 30, which is formed of an elastic material, is fitted into the attachment groove 21b2, so that the seal member 30 is located between the female thread portion 11b and the end surface of the hydraulic passage opening portion 11 of the pump housing 10. Thus, the inner circumferential surface of the seal member 30 abuts in a liquid-tight manner against the cylindrical joint portion 21b of the housing 21 of the hydraulic accumulator 20, whereas the outer circumferential surface of the seal member 30 abuts, in a liquid-tight manner, the hydraulic passage opening portion 11 of the pump housing 10.

In the hydraulic joint structure of the present embodiment having the above-described configuration, the passage P, which permits flow of leaked working fluid from the downstream space R to the external space in the state in which the pressure-contact surfaces 12 and 21a are in pressure contact, is formed in such a manner that the passage P extends in the circumferential direction of the thread portions, and communicates at one end with the downstream space R and at the other end with an external space.

Therefore, seal inspection for guaranteeing seal performance can be performed in a state in which the two members 10 and 20 have been tightly screw-engaged together in order to eliminate the gap between the pressure-contact surfaces 12 and 21a. Specifically, after completion of assembly of the two members 10 and 20, pressurized working fluid is applied to the upstream side of the seal member 30 and visual inspection is performed in order to determine whether the working fluid leaks to the external space via the passage P. Therefore, efficiency of work, including the seal inspection for guaranteeing seal performance, can be improved.

Further, since the passage P is formed to extend circumferentially along the thread portions 11b and 21b1 of the two members 10 and 20, the length of the passage P as measured from one end to the other end thereof can be increased to a sufficient degree, to thereby increase the distance from the external space to the seal member 30 to a sufficient degree. Therefore, this configuration prevents foreign matter and water from reaching the seal member 30 via the passage P, to thereby reliably mitigate damage to the seal member 30 which would otherwise be caused by the foreign matter or water.

Figure 5:
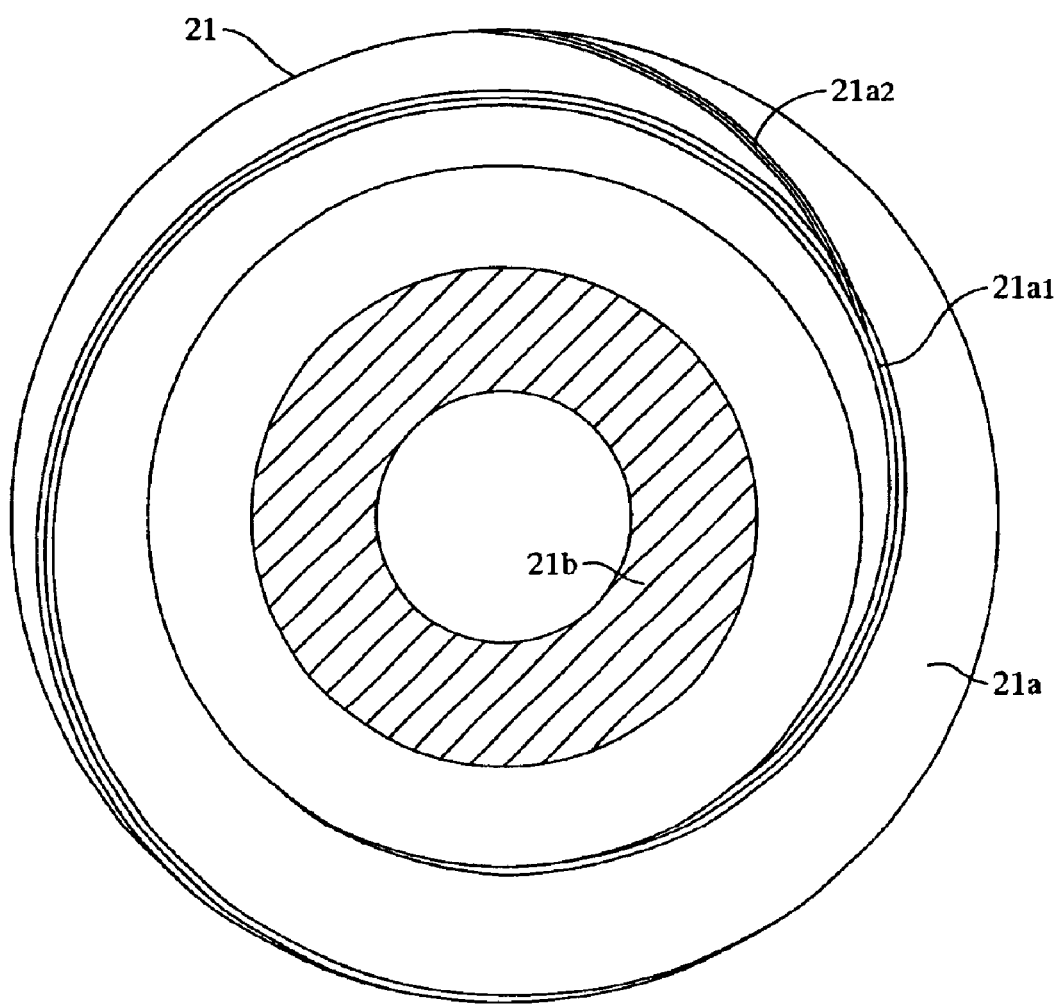
FIG. 5 is a bottom view similar to FIG. 4, showing a modified embodiment of the present invention.

In the above-described embodiment, as shown in FIG. 4, the spiral groove 21a1 is formed on the pressure-contact surface 21a of the housing 21 of the hydraulic accumulator 20. However, a spiral groove may be formed on the pressure-contact surface 12 of the pump housing 10. When the present invention is practiced, in addition to the spiral groove 21a1, an intake groove 21a2 may be formed on the pressure-contact surface 21a, as shown in FIG. 5, in order to permit entry of air into the spiral groove 21a1. In this case, when water enters the spiral groove 21a1, air introduced into the spiral groove 21a1 via the intake groove 21a2 facilitates discharge of the water. The intake groove 21a2 is smaller in cross sectional area than the spiral groove 21a1. Further, when the present invention is practiced, a step may be formed at a central portion of the spiral groove 21a1 in order to prevent entry of foreign matter and water into the radially inner side (the downstream space R).

In the above-described embodiment, the hydraulic joint structure according to the present invention is applied to attachment of the hydraulic accumulator 20 to the pump housing 10. However, the present invention can be applied to other types of hydraulic joint structures, each of which includes a first member having a first tubular joint portion having a female thread portion at an end thereof; a second member having a second tubular joint portion having a male thread portion at an end thereof for screw-engagement with the female thread portion; and an annular seal member disposed between the female portion and an end surface of the first tubular joint portion, the seal member abutting, in a liquid-tight manner, the first tubular joint portion at its outer circumference and the second tubular joint portion at its inner circumference, wherein the first member has a first pressure-contact surface constituted by the end surface of the first tubular joint portion, whereas the second member has a second pressure-contact surface, the second pressure-contact surface surrounding the second tubular joint portion and being brought into contact with the first pressure-contact surface in order to prevent loosening of the thread portions and to form a downstream space on the downstream side of the seal member, with respect to a direction of flow of any leaking working fluid; and a passage is formed on at least one of the first and second pressure-contact surfaces in such a manner that when working fluid leaks from the upstream side of the seal member to the downstream space via a clearance between the seal member and the first and second tubular joint portions, the passage permitting the working fluid to flow from the downstream space to an external space in the state in which the first and second pressure-contact surfaces are in pressure contact.

As is understood from the foregoing description, the present invention should by no means be limited to the illustrated examples, and various modifications may be possible without departing from the gist and scope of the invention.

What is claimed is:

1. A hydraulic joint structure comprising:
   a first member having a first tubular joint portion and a hydraulic passage extending to the first tubular joint portion, the first tubular joint portion having a female thread portion at an end thereof;
   a second member having a second tubular joint portion and a hydraulic passage extending to the second tubular joint portion, the second tubular joint portion having a male thread portion at an end thereof for screw-engagement with the female thread portion; and
   an annular seal member disposed between the female portion and an end surface of the first tubular joint portion, the seal member abutting, in a liquid-tight manner, the first tubular joint portion at its outer circumference and the second tubular joint portion at its inner circumference,
   wherein the first member has a first pressure-contact surface constituted by the end surface of the first tubular joint portion, whereas the second member has a second pressure-contact surface, the second pressure-contact surface surrounding the second tubular joint portion and being brought into contact with the first pressure-contact surface in order to prevent loosening of the thread portions and to form a downstream space on the downstream side of the seal member, with respect to a direction of flow of any leaking working fluid; and a passage is formed on at least one of the first and second pressure-contact surfaces in such a manner that when working fluid leaks from the upstream side of the seal member to the downstream space via a clearance between the seal member and the first and second tubular joint portions, the passage permits the working fluid to flow from the downstream space to an external space in the state in which the first and second pressure-contact surfaces are in pressure contact, wherein the passage is formed in such a manner that the passage extends in a circumferential direction of the thread portions, and communicates at one end with the downstream space and at the other end with the external space, wherein the passage is constituted by a spiral groove formed on at least one of the pressure-contact surfaces.

2. A hydraulic joint structure used for joining a housing of a hydraulic accumulator to a housing of a hydraulic device, comprising:

a first tubular joint portion being integral with the housing of the hydraulic device and having a female thread portion at an end thereof, a hydraulic passage formed in the housing of the hydraulic device extending to the first tubular joint portion;

a second tubular joint portion being integral with the housing of the hydraulic accumulator and having a male thread portion at an end thereof for screw-engagement with the female thread portion, a hydraulic passage formed in the housing of the hydraulic accumulator extending to the second tubular joint portion; and an annular seal member disposed between the female portion and an end surface of the first tubular joint portion, the seal member abutting, in a liquid-tight manner, the first tubular joint portion at its outer circumference and the second tubular joint portion at its inner circumference, wherein the housing of the hydraulic device has a first pressure-contact surface constituted by the end surface of the first tubular joint portion, whereas the housing of the hydraulic accumulator has a second pressure-contact surface, the second pressure-contact surface surrounding the second tubular joint portion and being brought into contact with the first pressure-contact surface in order to prevent loosening of the thread portions and to form a downstream space on the downstream side of the seal member, with respect to a direction of flow of any leaking working fluid; and a passage is formed on at least one of the first and second pressure-contact surfaces in such a manner that when working fluid leaks from the upstream side of the seal member to the downstream space via a clearance between the seal member and the first and second tubular joint portions, the passage permits the working fluid to flow from the downstream space to the external space in the state in which the first and second pressure-contact surfaces are in pressure contact, wherein the passage is formed in such a manner that the passage extends in a circumferential direction of the thread portions, and communicates at one end with the downstream space and at the other end with the external space, wherein the passage is constituted by a spiral groove formed on at least one of the pressure-contact surfaces.

* * * * *